US011567770B2

(12) United States Patent
Pineda de Gyvez et al.

(10) Patent No.: US 11,567,770 B2
(45) Date of Patent: Jan. 31, 2023

(54) HUMAN-MACHINE-INTERFACE SYSTEM COMPRISING A CONVOLUTIONAL NEURAL NETWORK HARDWARE ACCELERATOR

(71) Applicant: NXP B.V., Eindhoven (NL)

(72) Inventors: Jose de Jesus Pineda de Gyvez, Eindhoven (NL); Hamed Fatemi, Eindhoven (NL); Gonzalo Moro Pérez, Eindhoven (NL); Hendrik Corporaal, Rotselaar (BE)

(73) Assignee: NXP B.V., Eindhoven (NL)

( * ) Notice: Subject to any disclaimer, the term of this patent is extended or adjusted under 35 U.S.C. 154(b) by 1260 days.

(21) Appl. No.: 15/943,926

(22) Filed: Apr. 3, 2018

(65) Prior Publication Data

US 2018/0300138 A1   Oct. 18, 2018

(30) Foreign Application Priority Data

Apr. 13, 2017   (EP) .................................. 17166619

(51) Int. Cl.
*G06F 9/30* (2018.01)
*G06N 3/063* (2006.01)
(Continued)

(52) U.S. Cl.
CPC ........ *G06F 9/30112* (2013.01); *G06F 3/0488* (2013.01); *G06F 9/30* (2013.01);
(Continued)

(58) Field of Classification Search
CPC ...... G06F 9/30112; G06F 9/3001; G06F 9/30; G06F 9/462; G06F 17/153; G06F 17/16;
(Continued)

(56) References Cited

U.S. PATENT DOCUMENTS 5,923,871 A * 7/1999 Gorshtein ............. G06F 9/3885
712/221
8,385,631 B2   2/2013 Yamamoto et al.
(Continued)

FOREIGN PATENT DOCUMENTS

CN      106203617 A    12/2016
EP      3 035 204 A1   6/2016
EP         3035249 A1   6/2016

OTHER PUBLICATIONS

Utku Aydonat et al. "An OpenCLTM Deep Learning Accelerator on Arria 10" is cited for the teaching of convolution neural networks, Section 2.1, ACM. (Year: 2017).*
(Continued)

*Primary Examiner* — Michael J Metzger (57) ABSTRACT

A human-machine-interface system comprising: register-file-memory, configured to store input-data; a first-processing-element-slice, a second-processing-element-slice, and a controller. Each of the processing-slices comprise: a register configured to store register-data; and a processing-element configured to apply an arithmetic and logic operation on the register-data in order to provide convolution-output-data. The controller is configured to: load input-data from the register-file-memory into the first-register as the first-register-data; and load: (i) input-data from the register-file-memory, or (ii) the first-register-data from the first-register, into the second-register as the second-register-data.

16 Claims, 9 Drawing Sheets

(51) Int. Cl.
  *G06F 3/0488*  (2022.01)
  *G06F 9/46*  (2006.01)
  *G06N 3/02*  (2006.01)
  *G06V 40/20*  (2022.01)
  *G06F 17/15*  (2006.01)
  *G06K 9/62*  (2022.01)
  *G06N 3/04*  (2006.01)

(52) U.S. Cl.
  CPC .......... *G06F 9/3001* (2013.01); *G06F 9/462* (2013.01); *G06F 17/153* (2013.01); *G06K 9/6256* (2013.01); *G06N 3/02* (2013.01); *G06N 3/063* (2013.01); *G06N 3/0635* (2013.01); *G06V 40/20* (2022.01); *G06N 3/0454* (2013.01)

(58) Field of Classification Search
  CPC .......... G06K 9/00335; G06K 9/6256; G06K 9/00342; G06K 9/00348; G06K 9/00375; G06N 3/02; G06N 3/063; G06N 3/0635; G06N 3/0454
  USPC .......... 712/9, 14, 22, 221; 706/12, 20, 26, 27
  See application file for complete search history.

(56) References Cited

U.S. PATENT DOCUMENTS

| | | | |
|---|---|---|---|
| 8,422,927 | B2 | 5/2013 | Chakradhar et al. |
| 2004/0093484 | A1* | 5/2004 | Barry ............... G06F 9/30036 712/216 |
| 2011/0029471 | A1 | 2/2011 | Chakradhar et al. |
| 2011/0216853 | A1* | 9/2011 | Poklemba ............ H04L 27/00 375/316 |
| 2011/0239224 | A1 | 9/2011 | Yamamoto et al. |
| 2015/0170021 | A1 | 6/2015 | Lupon et al. |
| 2015/0199963 | A1* | 7/2015 | Maaninen ............ G10L 15/16 704/232 |
| 2016/0283441 | A1* | 9/2016 | Grinberg ............ G06F 9/3001 |
| 2016/0313801 | A1* | 10/2016 | Wagner .................. G09B 21/02 |
| 2017/0011006 | A1* | 1/2017 | Saber .................. G06N 3/063 |
| 2017/0011288 | A1* | 1/2017 | Brothers .............. G06F 9/3017 |
| 2017/0024632 | A1* | 1/2017 | Johnson ............... G06F 3/0683 |
| 2017/0206405 | A1* | 7/2017 | Molchanov ........ G06K 9/00355 |
| 2017/0236053 | A1* | 8/2017 | Lavigueur ............ G06N 3/063 706/31 |
| 2018/0173676 | A1* | 6/2018 | Tsai ........................ G06F 17/16 |
| 2018/0189633 | A1* | 7/2018 | Henry .................. G06N 3/0445 |

OTHER PUBLICATIONS

Moons, Bert et al; "Energy-Efficient ConvNets Through Approximate Computing"; IEEE Winter Conference on Applications of Computer Vision; 8 pages (2016).

Chen, Yu-Hsin et al; "Eyeriss: An Energy-Efficient Reconfigurable Accelerator for Deep Convolutional Neural Networks"; IEEE International Solid-State circuits Conference, San Francisco, CA, US Jan. 31-Feb. 4, 2016; MIT Open Access Articles; 4 pages (2016).

Du, Zidong et al; "ShiDianNao: Shifting Vision Processing Closer to the Sensor"; Proceedings of the 42nd Annual International Symposium on Computer Architecture, New York, NY, USA; 13 pages (Jan. 1, 2015).

Duffner, Stefan et al; "3D Gesture Classification with Convolutional Neural Networks"; IEEE International Conference on Acoustics, Speech and Signal Processing, Florence, Italy; IEEE Xplore; 5 pages (Jul. 14, 2014).

Krizhevsky, Alex et al; "ImageNet Classification with Deep Convolutional Neural Networks"; retrieved from the Internet https://www.nvidia.cn/content/tesla/pdf/machine-learning/imagenet-classification-with-deep-convolutional-nn.pdf; 9 pages (2012).

Zhang, Chen et al; "Optimizing FPGA-based Accelerator Design for Deep Convolutional Neural Networks"; Proceedings of the 2015 ACM/SIGDA International Symposium on Field-Programmable Gate Arrays. Monterey, CA, US, Feb. 22-24, 2015; ACM, New York, NY, USA; 10 pages (Feb. 22, 2015).

Peemen, Maurice et al; "Memory-Centric Accelerator Design for Convolutional Neural Networks"; IEEE International Conference on Computer Design, Asheville, NC, USA; IEEE Xplore; 7 pages (Nov. 7, 2013).

Peeman, M.C.J.; "Mapping Convolutional Neural Networks on a Reconfigurable FPGA Platform"; Graduation Symposium; 11 pages (Oct. 12, 2010).

Peeman, Maurice et al; "The Neuro Vector Engine: Flexibility to Improve Convolutional Net Efficiency for Wearable Vision"; IEEE Design, Automation & Test in Europe Conference & Exhibition, Dresden, Germany Mar. 14-18, 2016, IEEE Explore; 6 pages (Apr. 28, 2016).

Peemen, Maurice et al; "A Data-Reuse Aware Accelerator for Large-Scale Convolutional Networks"; retrieved from the Internet https://pdfs.semanticscholar.org/1d90/73111ebac4d15d13d6c175f91fbc8e45692b.pdf; 3 pages (2014).

Jiang, Wenchao et al; "Human Activity Recognition using Wearable Sensors by Deep Convolutional Neural Networks"; Multimedia ACM, 2 Penn Plaza, Suite 701, New York, NY 10121-0701 USA; 4 pages (Oct. 13, 2015).

Pylvanainen, Timo; "Accelerometer Based Gesture Recognition Using Continuous HMMs"; Springer-Verlag Berlin Heidelberg; 8 pages (2005).

Shi, Runbin et al: "A Locality Aware Convolutional Neural Networks Accelerator"; IEEE 2015 Euromicro Conference on Digital System Design, Aug. 26, 2015; 8 pages (2015).

Sim, Jaehyeong et al; "A 1,42TOPS/WDeep Convolutional Neural Network Recognition Processor for Intelligent IoE Systems"; ISSCC 2016, Session 14, Next-Generation Processing/14.6, Kaist, Daejeon, Korea; IEEE international Solid-State Circuits Conference; 3 pages (Feb. 2, 2016).

Szegedy, Christian et al; "Going deeper with convolutions"; IEEE Conference on Computer Vision and Pattern Recognition, Boston, MA, USA; IEEE Xplore; 12 pages (Oct. 15, 2015).

* cited by examiner

HUMAN-MACHINE-INTERFACE SYSTEM COMPRISING A CONVOLUTIONAL NEURAL NETWORK HARDWARE ACCELERATOR

CROSS-REFERENCE TO RELATED APPLICATIONS

This application claims the priority under 35 U.S.C. § 119 of European patent application no. 17166619.1, filed Apr. 13, 2017 the contents of which are incorporated by reference herein.

The present disclosure relates to human-machine-interface systems, and in particular, although not exclusively, to human-machine-interface systems that apply convolutional neural network processing to classify human interactions with a machine According to a first aspect of the present disclosure there is provided a human-machine-interface system comprising:
- a register-file-memory, configured to store input-data;
- a first-processing-element-slice comprising:
  - a first-register configured to store first-register-data; and
  - a first-processing-element configured to apply an arithmetic and logic operation on the first-register-data in order to provide first-convolution-output-data;
- a second-processing-element-slice comprising:
  - a second-register configured to store second-register-data; and
  - a second-processing-element configured to apply a convolutional neural network algorithm to the second-register-data in order to provide second-convolution-output-data; and
- a controller configured to:
  - load input-data from the register-file-memory into the first-register as the first-register-data; and
  - load: (i) input-data from the register-file-memory, or (ii) the first-register-data from the first-register, into the second-register as the second-register-data.

By being able to load information into the second-register using option (ii), advantageously, the number of memory access requests from the second-register to the register-file-memory can be reduced. This can be particularly significant because it can reduce the overheads (such as voltage, and processing power) required to perform the processing.

In one or more embodiments, the controller is configured to: load a first subset of the input-data from the register-file-memory into the first-register as the first-register-data; and load: (i) a second subset of the input-data from the register-file-memory into the second-register as the second-register-data. The first subset of input-data may be different to the second subset of input-data.

In one or more embodiments, the human-machine-interface system further comprises an intermediate-register. The controller may be configured to: load the first-register-data from the first-register into the intermediate-register as intermediate-data; and load the intermediate-data from the intermediate-register into the second-register as the second-register-data.

In one or more embodiments, the human-machine-interface system further comprises a plurality of intermediate-registers, serially connected between the first-register and the second-register.

In one or more embodiments, the human-machine-interface system further comprises one or more further-processing-element-slices, such that the first-processing-element-slice, the second-processing-element-slice and the one or more further-processing-element-slices are provided as a sequence of processing-slices. Each of the one or more further-processing-element-slices may comprise: a further-register configured to store further-register-data; and a further-processing-element configured to apply a convolutional neural network algorithm to the further-register-data in order to provide further-convolution-output-data. The controller may be configured to: load: (i) input-data from the register-file-memory; or (ii) register-data from an earlier register in the sequence of processing-slices; into each further-register as the further-register-data.

In one or more embodiments, the human-machine-interface system further comprises a weights-memory, configured to provide weights-data to each processing-element of the processing-element-slices. Each processing-element of the processing-element-slices may be configured to apply the arithmetic and logic operation based on the weights-data.

In one or more embodiments, the human-machine-interface system further comprises a bias-memory, configured to provide bias-data to each processing-element of the processing-element-slices. Each processing-element of the processing-element-slices may be configured to apply the arithmetic and logic operation based on the bias-data.

In one or more embodiments, the register-file-memory comprises a register-file-block associated with each of the processing-element-slices. The controller may be configured to load input-data into the register of a processing-element-slice from the associated register-file-block.

In one or more embodiments, the controller is configured to load input-data into the register of a processing-element-slice from a register-file-block associated with a different processing-element-slice.

In one or more embodiments, the human-machine-interface system further comprises a look-up-table configured to apply a non-linear function to the convolution-output-data provided by each of the processing-elements in order to provide feature-map-output-data.

In one or more embodiments, the controller is configured to write the feature-map-output-data into the register-file-memory.

In one or more embodiments, a processing-element is configured to add the feature-map-output-data in order to provide output-classification-data.

In one or more embodiments, the input-data is representative of non-contact human-machine-interface-signals.

In one or more embodiments, the input-data comprises analogue sensor data.

In one or more embodiments, the human-machine-interface comprises a gesture recognition system.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

BRIEF DESCRIPTION OF DRAWINGS

One or more embodiments will now be described by way of example only with reference to the accompanying drawings in which.

Human Machine Interfaces (HMI) are an example of technology that can be used in relation to the Internet of Things (IoT), with applications in e-Health, lifestyle, and fashion choices, for example. User interaction with these new technologies can benefit from systems that go beyond known command or graphical user interfaces. Providing an improved human/machine interface (HMI) can provide significant benefits for a number of applications, including consumer technologies such as those involving cars, televisions, mobile handsets, etc. User interface technologies that are employed in these applications can include navigation, intuitive interfaces, search, control and predictive/adaptive elements. A key area of advancement in user interfaces is in touch, gesture and motion classification. Non-contact gestures can enable new intuitive interfaces for a variety of products. For example, to enable consumers to be able to rotate their hands in the air to change the volume on a car radio, or to turn off a light with the wave of a hand.

Figure 1:
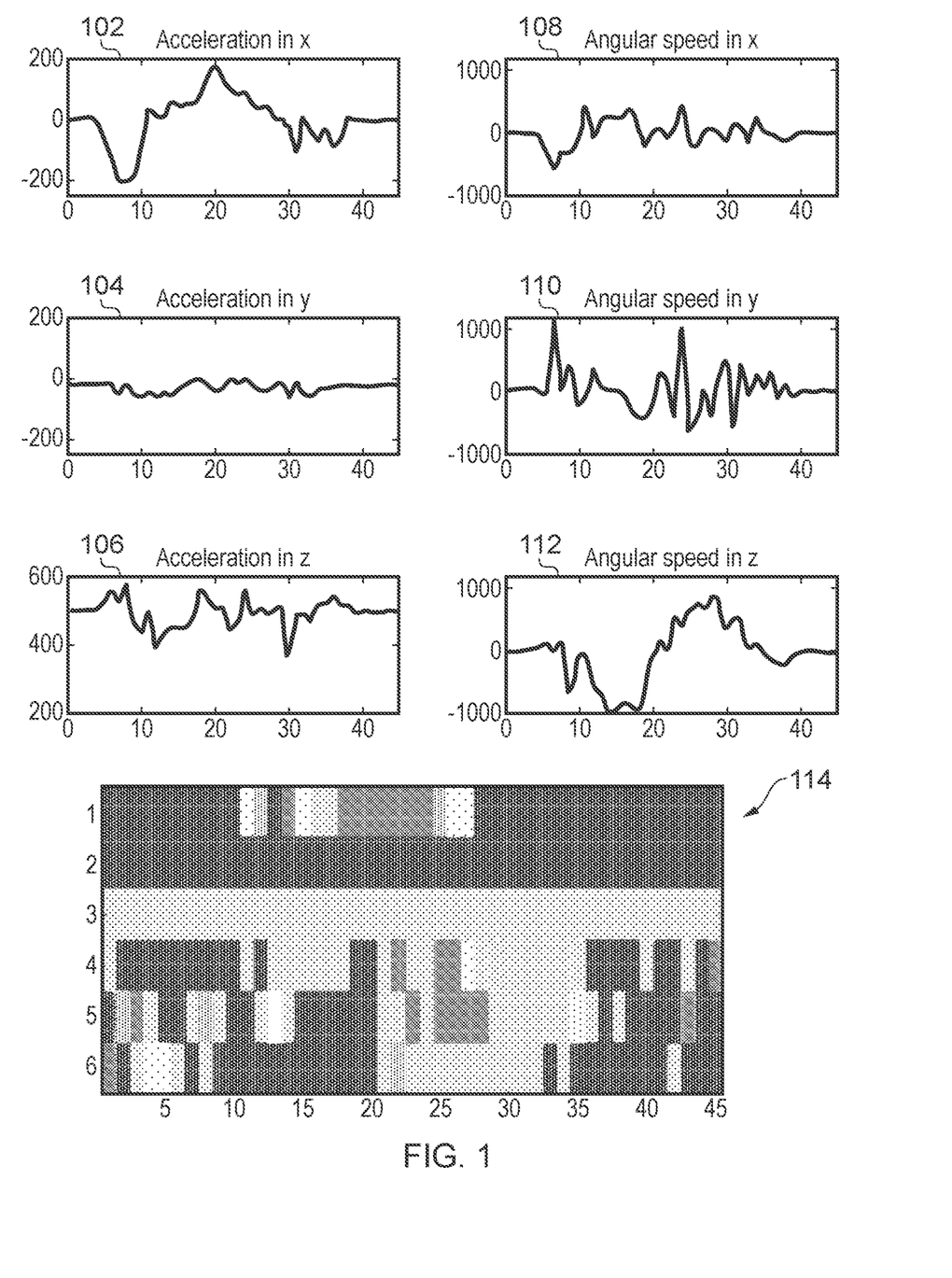
FIG. 1 shows graphically how continuous-time analogue signals, such as those provided by inertial sensors, can be treated as discretized pixels.

MEM (microelectromechanical), ultrasound, and radar sensor-based gesture recognition systems can be divided into three categories: temporal signal modelling, temporal warping and statistical machine learning. A convolutional neural network (CNN) algorithm can be used to process inertial signals, in order to provide accurate classification of a gesture. This opens possibilities, not only for gesture recognition, but also for other applications in which the CNN algorithm may outperform the methods which have been used until now, FIG. 1 shows graphically how continuous-time analogue signals 102-112, such as those provided by inertial/MEM-sensors, can be treated as discretized pixels 114. In this way, the discretized pixels 114 can be suitable for processing by a CNN algorithm.

In FIG. 1, six plots of analogue signals 102-112 are shown. In this example, the analogue signals 102-112 represent signals provided by an accelerometer and a gyroscope, whereby each plot is representative in one of 3 perpendicular dimensions. The data levels from the analogue signals 102-112 is encoded as a 2D matrix of pixel values 114, where each row in the matrix represents data returned by one of the sensors, and each column represents a different value in the time domain, with time increasing from left to right as it is shown in FIG. 1.

Figure 2:
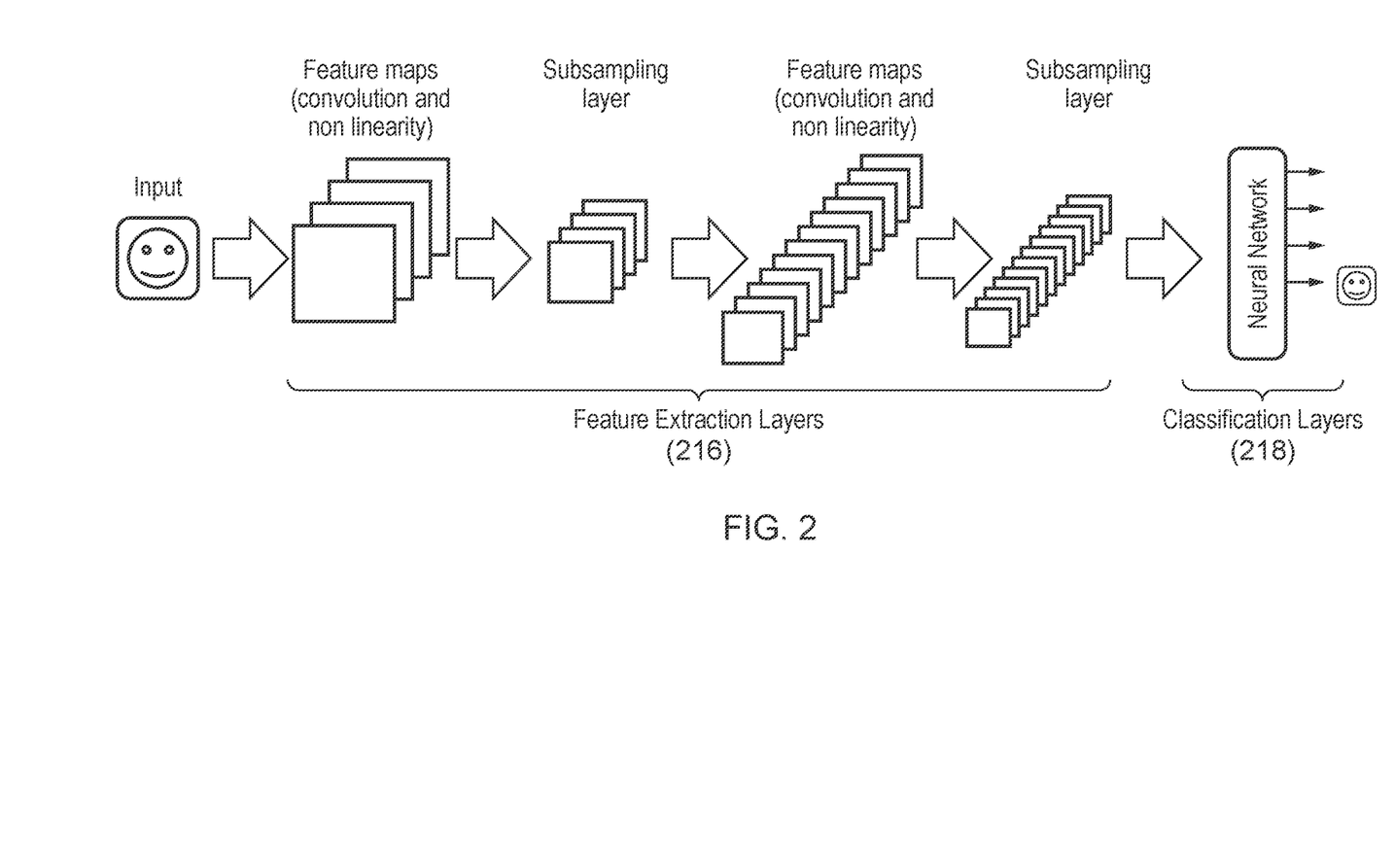
FIG. 2 shows schematically the processing that can be performed by a convolutional neural network (CNN)

FIG. 2 shows schematically the processing that can be performed by a convolutional neural network (CNN). This instance of the CNN algorithm includes feature extraction layers 216 (which includes Convolutional layers and subsampling layers) followed by classification layers 218 (which includes Artificial Neural Network (ANN) layers). The feature extraction layers 216 include two convolutional and two subsampling layers in this example. In the first convolutional layer, 4 convolution filters are run, while in the second convolutional layer, there are 12 convolutional filters. The classification layers 218 include a two layer deep Artificial Neural Network (ANN) in this example.

Convolutional Neural Networks belong to the family of machine learning algorithms, and is similar to a classical ANN. A CNN can be specifically designed based on the assumption that the input is an image, and can often include complex processing for high-performance image processing. Beneficially, it has been found that converting (analogue) continuous-time input signals into a two-dimensional array of data can enable the CNN to be used in a manner can provide a good throughput of data, for low power operation, thereby providing good energy efficiency. Such low power operation would not be possible in high-performance image processing applications. Also, ANNs may not scale very well when the input is an image because all input pixels should be connected to all neurons, meaning that there are many connections. This feature extraction can include filtering the input image and subsampling it so that the number of connections in the ANN will be advantageously reduced.

There can be a difference between the neurons in the feature extraction layers 216 and the neurons in the classification layers 218. The first ones connect a subset of the input pixels to create a pixel in a so-called output feature map, and they all have the same weights within the same output feature map. The latter ones are fully connected to all input pixels as in the regular ANN algorithm.

Convolutional layers run a convolution filter over a given input:

$$O(x, y) = \sum_{k=0}^{K-1} \sum_{l=0}^{L-1} w[k, l] * I[x+k, y+l] + b$$

where O and I are respectively the output and input feature maps, K and L are respectively the horizontal and vertical dimensions of the convolution filter and w[k,l] and b are the weights and the bias of the filter. This operation gives one very interesting characteristic which is position invariance since the same filter runs over the whole image.

Subsampling layers are used for dimension reduction. There are different ways to carry out the subsampling, such as averaging:

$$O(x, y) = \sum_{k=0}^{S-1} \sum_{l=0}^{S-1} I[x*S+k, y*S+l]$$

where S defines the size of the subsampling layer. Dimension reduction is interesting in the way that small patches over a compressed version of the input will cover information of a rather bigger region of the input image. After each convolutional or subsampling layer a non-linear function, σ( ) is added. Both convolutional and subsampling layers can be included as part of the feature extraction layer 216, which will reduce the number of MACC (multiply-accumulate) operations:

$$O(x, y) = \sum_{k=0}^{K+S-2} \sum_{l=0}^{K+S-2} \tilde{w}[k, l] * I[x*S + k, y*S + l]$$

where $\tilde{w}[k,l]$ is the new convolution kernel.

The classification layers 218 consist of a traditional ANN. Neural network layers are fully connected layers which are included to carry out the final classification. The result of the preceding layer is expressed as a one dimensional input. The operation performed by the classification layers 218 is:

$$n(i) = \sum_{k=0}^{K} w[i, k] * I[k] + b[i]$$

where l[k] is the input, n[i] is the output, w[i,k] are the trainable weights, b[i] is the bias, and K is the number of neurons in the preceding layer.

It is also possible to see from FIG. 2 that the CNN algorithm has a lot of free parameters such as the number of layers, the number of convolution kernels, the sizes of the kernels, the connections between layers or the number of neurons. These parameters will define the so-called CNN structure or algorithm structure.

Figure 3:
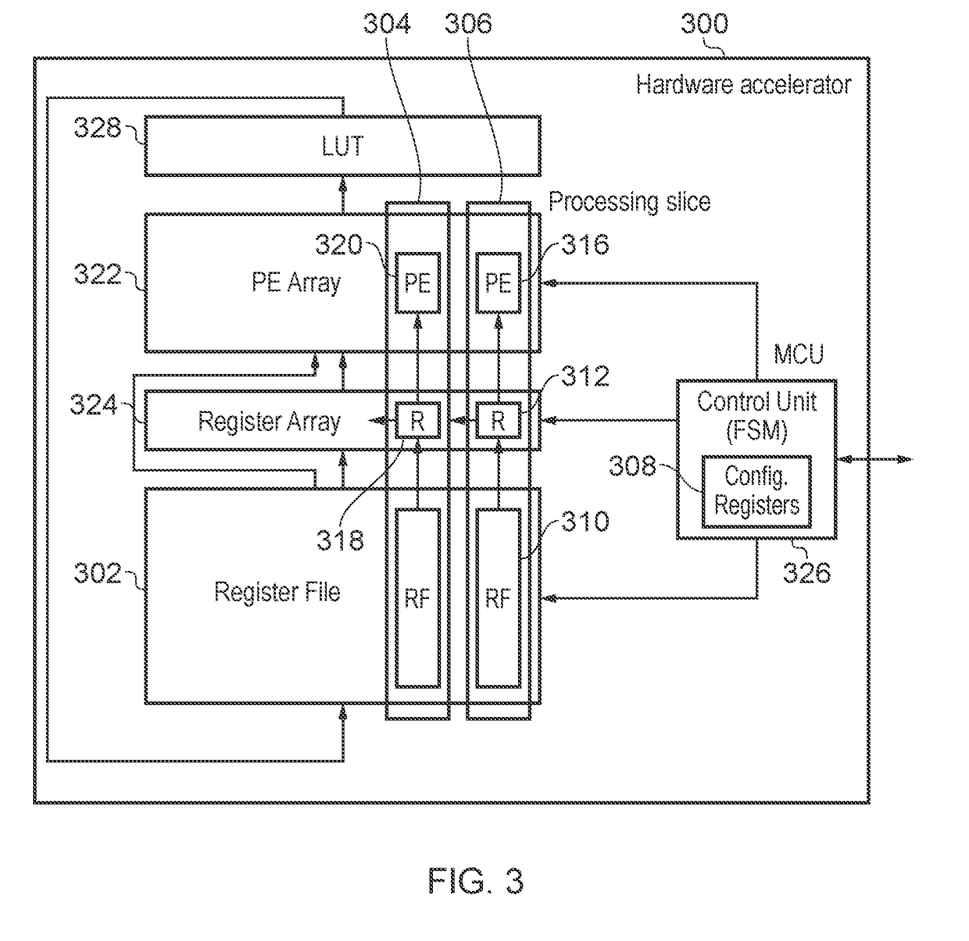
FIG. 3 shows an example embodiment of a human-machine-interface system, which may also be referred to as a hardware accelerator.

FIG. 3 shows an example embodiment of a human-machine-interface system 300, which may also be referred to as a hardware accelerator. The human-machine-interface system 300 includes a register-file-memory 302, a first-processing-element-slice 304, a second-processing-element-slice 306, and a controller 308.

As will be discussed below, the human-machine-interface system 300 is for processing input-data (that is stored in the register-file-memory 302) that can be representative of analogue sensor data. The input-data can be representative of non-contact human-machine-interface-signals (in that the human has not made physical contact with a machine interface), or any other input signals that can be provided to a human-machine-interface system. The human-machine-interface system 300 is not suitable for performing high-performance processing of image data because it can be a low-power, high efficiency, system that does not have the processing capabilities that would be necessary for high-performance image processing.

The register-file-memory 302 stores the input-data. In this example, the register-file-memory 302 includes a plurality of register-files (RF) 310, whereby each register-file (RF) 310 is associated with a processing-slice 304, 306. In some examples, each register-file (RF) 310 can be accessed by any one of the processing-slices 304, 306. In other examples, the register-file-memory 302 may not be arranged as the plurality of register-files (RF) 310 as they are shown in FIG. 3.

The first-processing-element-slice 304 includes a first-register 312 and a first-processing-element 316. The first-register 312 can store first-register-data. The first-processing-element 316 can apply an arithmetic and logic operation on the first-register-data in order to provide first-convolution-output-data (not shown in FIG. 3).

Similarly, the second-processing-element-slice 306 includes a second-register 318 and a second-processing-element 320. The second-register 318 can store second-register-data. The second-processing-element 320 can apply an arithmetic and logic operation on the second-register-data in order to provide second-convolution-output-data (not shown in FIG. 3).

The first-processing-element 316 and the second-processing-element 320 can be considered as part of a processing-element-array 322. Also, the first-register 312 and the second-register 318 can be considered as part of a register-array 324.

The processing-elements 316, 320 can also receive weights-values and bias-values from memory, and apply these values as part of the arithmetic and logic operation. The weights-values and bias-values may be stored in the register-file-memory 302, and can be received by the processing-elements 316, 320 through the register-array 324.

As will be discussed below, the first-processing-element 316 can process a subset of the input-data in order to provide the first-convolution-output-data, and the second-processing-element 320 can process a different subset of the input-data in order to provide the second-convolution-output-data. The first-convolution-output-data and the second-convolution-output-data can then be processed together, and in combination with further convolution-output-data provided by further processing-slices, to provide feature-map-output-data.

In relation to the first-register 312, the controller 308 can load input-data from the register-file-memory 302 into the first-register 312 as the first-register-data. In relation to the second-register 318, the controller 308 can load either: (i) input-data from the register-file-memory 302, or (ii) the first-register-data from the first-register 312, into the second-register as the second-register-data. By being able to load information into the second-register 318 using option (ii), advantageously, the number of memory access requests from the register-array 324 to the register-file-memory 302 can be reduced. This can be particularly significant because it can reduce the overheads (such as voltage, and processing power) required to perform the processing.

It will be appreciated that the controller 308 can load specific data into specific registers, from specific locations in the register-file-memory 302 or other registers, by setting the state of switches and/or multiplexers to control a data path. The controller 308, which may be implemented as a finite state machine (FSM), can direct operations in all the modules of the human-machine-interface system 300.

The controller 308 may include, or have access to configuration registers 326. These can be used to configure the structure of the algorithm that is applied by the human-machine-interface system 300, and can include settings for the kernel size, number of layers, number of kernels per layer, connections between feature extraction layers and number of neurons in the classification stage. Also, it can include the operation mode, and status and start registers which indicate when the CNN has finished or needs to begin the computation. These are examples of commands that can be provided to a CNN, for instance, configure, load weights, load data, run. Also, when input data is sent to the CNN, it is possible that it does not fit at once. Thus, the data may be sent sequentially, and as such the CNN may (re)start computations to implement the algorithm. The configuration registers 326 may store information to enable the CNN to be implemented in this way.

The human-machine-interface system 300 in this example also includes a look-up table (LUT) 328 that can apply the non-linear function, σ( ) to the convolution-output-data provided by each of the processing-elements 316, 320 in order to provide the feature-map-output-data. In this way, after the convolution has been executed, the results can be passed through a nonlinear function to "emphasize" features within the feature map. In this example, as shown in FIG. 3, the feature-map-output-data is written into the register-file-memory 302. In this way, after the processing-element-array 322 has finished a computation, it can write it back to memory 302 after going through the LUT 328.

In this way, a LUT can be used to implement the non-linear function in each neuron. A LUT is a fast way to realize a complex function in digital logic. An advantage is that computing the function can only take a single memory look-up, regardless of the complexity of the function, and so it is very fast.

Figure 4:
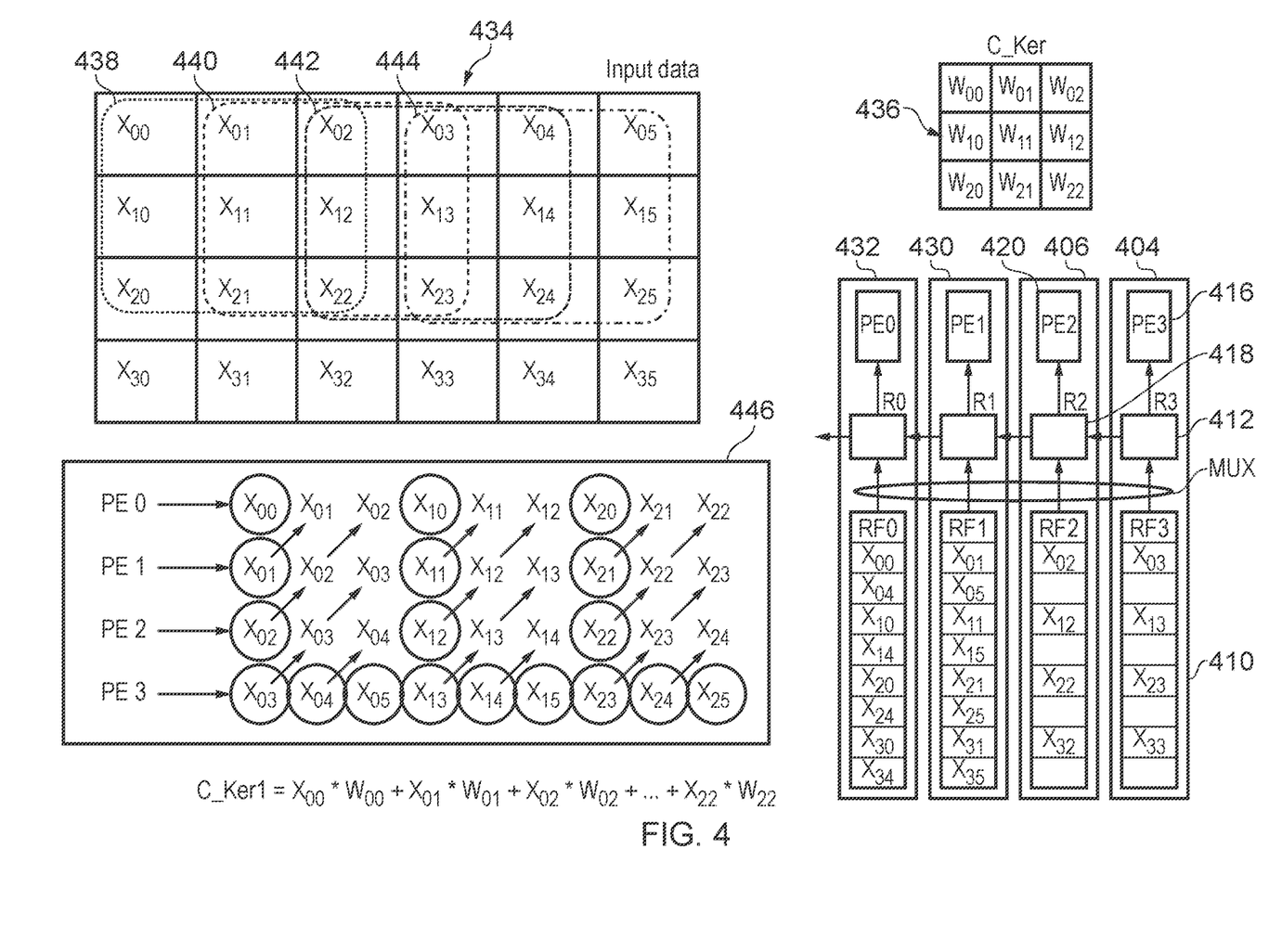
FIG. 4 illustrates an example of data processing flow for the human-machine-interface system (CNN accelerator) of FIG. 3.

FIG. 4 illustrates an example of data processing flow for the human-machine-interface system (CNN accelerator) of FIG. 3. FIG. 4 shows four processing-slices: a first-processing slice 404, a second-processing slice 406, a third-processing slice 430, and a fourth-processing slice 432. Each of the processing-slices 404, 406, 430, 432 includes: a processing-element PE3 416, PE2 420, PE1, PE0; a register R3 412, R2 418, R1, R0; and a register-file RF3 410, RF2, RF1, RF0. The functionality of a multiplexer (MUX) is shown between the register-files RF3 410, RF2, RF1, RF0 and the registers R3 412, R2 418, R1, R0 to represent that a switching network can be used to selectively connect any one of the register-files RF3 410, RF2, RF1, RF0 to any one of the registers R3 412, R2 418, R1, R0.

The input-data $x_{nn}$ 434 is shown as a two-dimensional matrix of data. As discussed above with reference to FIG. 1, the input-data 434 can be representative of the values of a plurality of analogue sensor signals over a period of time. The register-files RF3 410, RF2, RF1, RF0 of the processing slices store the input-data $x_{nn}$ 434. It will be appreciated that it does not matter which register-file stores which input-data values.

In this example, the human-machine-interface system applies the functionality of a 3×3 convolution filter. The convolution-filter-weighting values $w_{nn}$ 436 are shown in FIG. 4. The convolution-filter-weighting values $w_{nn}$ 436 are applied to a plurality of 3×3 subsets of the input-data $x_{nn}$ 434 in order to determine a plurality of convolution-output-data. Four 3×3 subsets of the input-data $x_{nn}$ 434 are labelled in FIG. 4 with reference numbers 438, 440, 442, 444.

In this example a subsampling value of 1 is applied. Therefore, the 3×3 subsets of the input-data 438, 440, 442, 444 that will be processed are adjacent to each other in the input-data $x_{nn}$ 434, and there is a maximum overlap between the subsets of the input-data $x_{nn}$.

Each processing-slice 404, 406, 430, 432 multiplies one of the 3×3 subsets of the input-data 438, 440, 442, 444 by the convolution-filter-weighting values $w_{nn}$ 436. As shown in box 446 in FIG. 4, each row of input-data values $x_{nn}$ corresponds to one of the 3×3 subsets of the input-data 438, 440, 442, 444. For instance, the bottom row in box 446 represents the input-data vales that are included in a first 3×3 subset 444 of the input-data $x_{nn}$ 434. Similarly, the second-from-bottom, third-from-bottom and top rows of data in box 446 correspond to a second 442, third 440, and fourth 438 3×3 subset of the input-data $x_{nn}$, respectively.

Associated with each row of input-data in box 446 is an identifier of one of the processing-elements (PE0, PE1, PE2, PE3). The columns in the input-data in box 446 represent the input-data $x_{nn}$ that is processed by the corresponding processing-element at each processing cycle. For instance, from left to right, for the first-processing-element PE3:

at a first processing cycle: $x_{03}$ is multiplied by $w_{00}$; that is, (the top-left input-data value of the first subset 444) is multiplied by (the top-left value of the convolution-filter-weighting values $w_{nn}$ 436);

at a second processing cycle: $x_{04}$ is multiplied by $w_{01}$; that is, (the top-middle input-data value of the first subset 444) is multiplied by (the top-middle value of the convolution-filter-weighting values $w_{nn}$ 436);

at a third processing cycle: $x_{05}$ is multiplied by $w_{02}$; that is, (the top-right input-data value of the first subset 444) is multiplied by (the top-right value of the convolution-filter-weighting values $w_{nn}$ 436);

at a fourth processing cycle: $x_{13}$ is multiplied by $w_{10}$; that is, (the middle-left input-data value of the first subset 444) is multiplied by (the middle-left value of the convolution-filter-weighting values $w_{nn}$ 436);

etc.

As will be discussed below, the first-processing-element can accumulate/add together the results of each of the multiplications, in order to determine first-convolution-output-data, which can be represented mathematically as:

$$C\text{-}Ker3 = x_{03}*w_{01} + x_{04}*w_{01} + x_{05}*w_{02} + \ldots x_{25}*w_{22}$$

The other processing-elements can determine respective convolution-output-data in a similar way. As shown in FIG. 4, the four processing-elements 404, 406, 430, 432 can operate in parallel such that they are simultaneously processing subsets of data in order to determine their respective convolution-output-data (which may also be referred to as output data points).

As discussed above with reference to FIG. 3, a controller is used to load input-data from one of the register-files RF3, RF2, RF1, RF0 into the first-register R3, for processing by the first-processing-element 416. The controller is also used to either: (i) load input-data from one of the register-files RF3, RF2, RF1, RF0 into the second-register R2 418; or (ii) load the first-register-data from the first-register R3 412, into the second-register R2 418. The second-processing-element 420 can then process the second-register-data that has been loaded into the second-register R2 418.

It will be appreciated that the input-data $x_{nn}$ shown in box 446 represents the input-data that has been loaded into the registers associated with the associated processing-elements (PE3, PE2, PE1, PE0). Input-data $x_{nn}$ that is shown in box 446 within a circle, represents input-data that has been loaded from one of the register-files RF3 410, RF2, RF1, RF0. Input-data $x_{nn}$ that is shown in box 446 that is not within a circle, represents input-data that has been loaded from a register of one of the other processing-slices 404, 406, 430, 432. The transfer of input-data $x_{nn}$ between registers is identified with an arrow inside box 446, and also by arrows between the neighbouring registers R3 412, R2 418, R1, R0 in the processing-slices.

Advantageously, by transferring input-data $x_{nn}$ between registers R3 412, R2 418, R1, R0, fewer memory accesses are required. In this way, data that has been retrieved from the register-file-memory can be considered as being reused. In some applications, this can be considered as much more efficient than retrieving input-data $x_{nn}$ from memory each time a processing-element is required to perform an operation on the input-data $x_{nn}$.

FIG. 4, and especially the box 446 in FIG. 4, illustrates that a pattern repeats: for each row of the convolution filter, all registers/processing-elements load an element of input-data from the register-file-memory (in this example from their own register-file RF). Subsequently, only the first-register R3/first-processing-element PE3 loads an element of input-data from the register-file-memory (not necessarily its own register-file RF), while the other registers R2, R1, R0 receive the required element of input-data from its preceding/neighbouring register. This is possible because the preceding/neighbouring register includes the required input-data, because it was used by the neighbouring/preceding processing-element for the previous processing cycle.

Figure 5A:
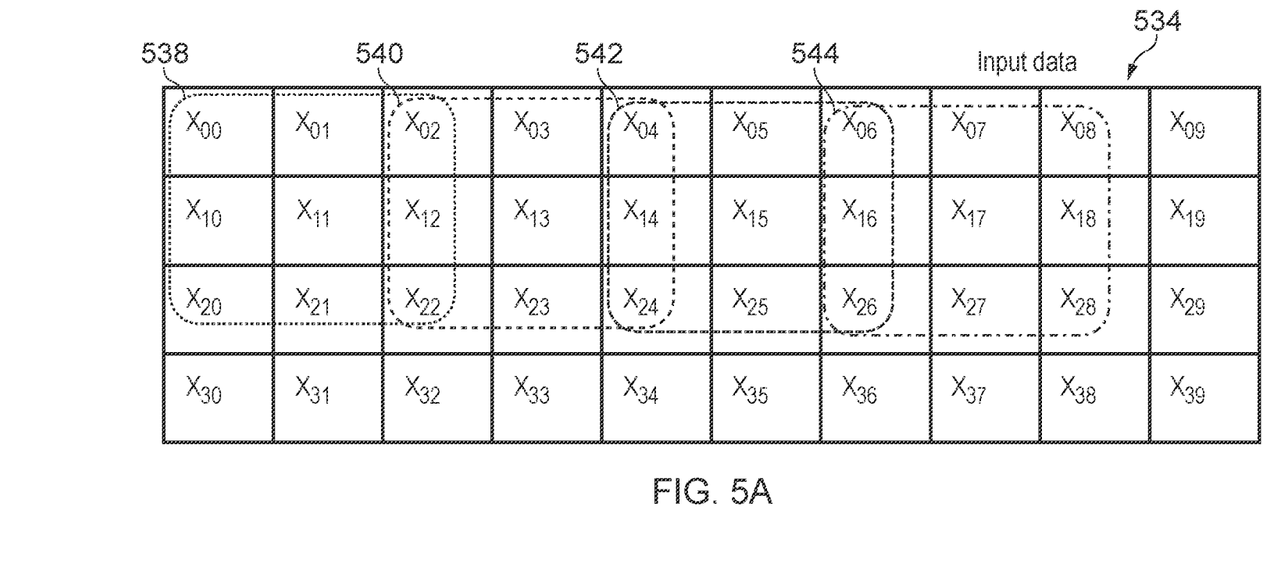
FIGS. 5A and 5B illustrate another example of data processing flow for the human-machine-interface system (CNN accelerator) of FIG. 3.
Figure 5B:
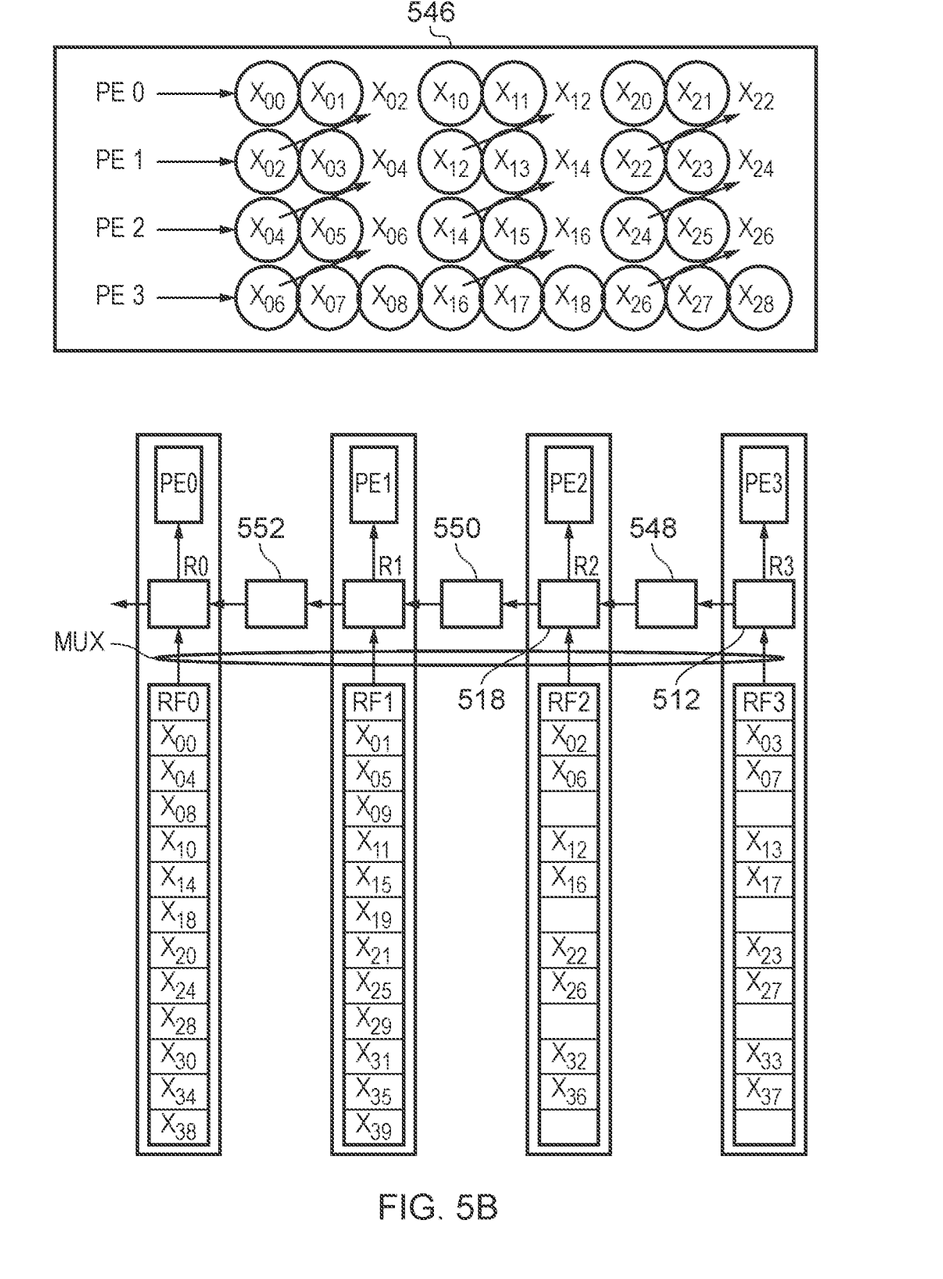

FIGS. 5A and 5B illustrate another example of data processing flow for the human-machine-interface system (CNN accelerator) of FIG. 3. Features of FIGS. 5A and 5B that are also shown in FIG. 4 have been given corresponding reference numbers in the 500 series, and will not necessarily be described again here.

In this example a subsampling value of 2 is applied. Therefore, the 3×3 subsets of the input-data 538, 540, 542, 544 that will be processed are spaced apart by one value of the input-data $x_{nn}$ 434. In this way, there is a smaller overlap between the subsets of the input-data $x_{nn}$ than for the example of FIG. 4.

The human-machine-interface system of this example includes an intermediate-register 548, 550, 552 between, and in data communication with, registers R3 512, R2 518, R1, R0 of the neighbouring processing-slices 504, 506, 530, 532. In particular:
- a first-intermediate-register 548 is between, and in data communication with (i) the first-register R3 512 and the second-register R2 518;
- a second-intermediate-register 550 is between, and in data communication with (i) the second-register R2 518 and the third-register R1; and
- a third-intermediate-register 552 is between, and in data communication with (i) the third-register R1 and the fourth-register R0.

In relation to the first-intermediate-register 548, the controller (not shown) loads the first-register-data from the first-register R3 512 into the first-intermediate-register 548 as intermediate-data. Then, for a subsequent processing cycle, the controller loads the intermediate-data from the first-intermediate-register 548 into the second-register R2 518 as the second-register-data. It will be appreciated that the controller corresponding loads data into, and out of, the second-intermediate-register 550 and the third-intermediate-register 552, in a similar way to that described for the first-intermediate-register 548.

Use of the intermediate-registers 548, 550, 552 can advantageously enable the subsampling and the convolutional operations to be performed simultaneously. Also, accesses to the register-files (RF) are reduced which results in lower power consumption.

The example of FIGS. 5A and 5B, especially the transfer of input-data $x_{nn}$ that is shown in box 546 in FIG. 5B, shows how a reuse-distance increases as the subsampling factor increases. The reuse-distance is related to the subsampling level—for example, a subsampling level of 2 means that the filter is shifted by two columns (as shown in FIG. 5B), and so on. Nonetheless, use of the intermediate-registers 548, 550, 552 still profits from data reuse because not all of the operations to load input-data into the registers requires direct retrieval of the input-data form the register-files RF3, RF2, RF1, RF0. This is evidenced by not all of the input-data values $x_{nn}$ in the box 546 being circled—that is, at least some of the input-data values $x_{nn}$ are shown as transferred across from a register R3, R2, R1, R0 of a neighbouring processing-slice 504, 506, 530, 532.

It will be appreciated that any number of intermediate-registers can be included between neighbouring processing-slices, in order to handle any subsampling value/rate, including a value of 3 or more. That is, a plurality of intermediate-registers can be serially connected between the first-register and the second-register, and also between all registers associated with consecutive processing-element-slices.

Figure 6:
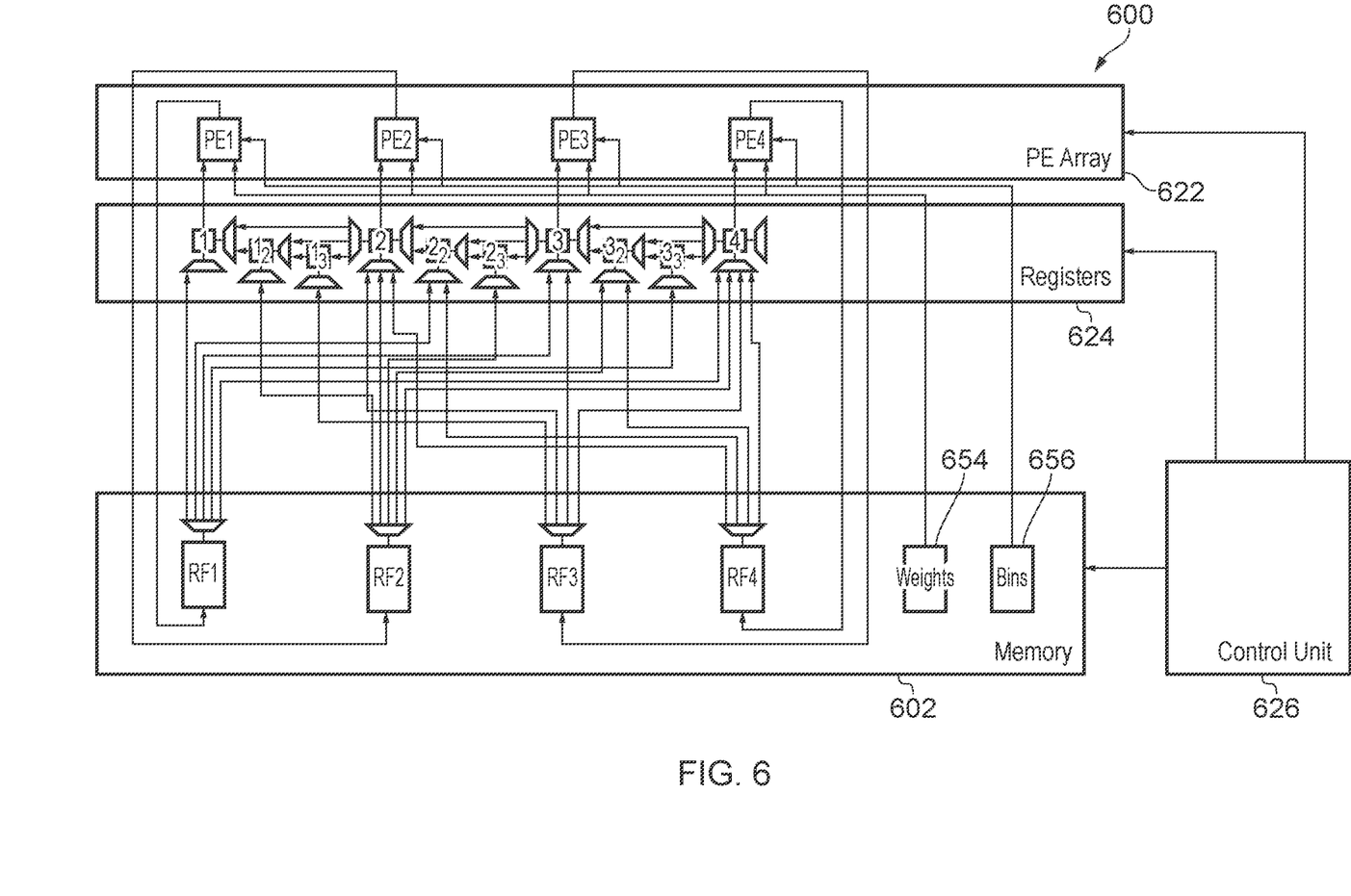
FIG. 6 shows further details of an architecture of a human-machine-interface system.

FIG. 6 shows further details of an architecture of a human-machine-interface system 600. Features of FIG. 6 that are also shown in FIG. 3 have been given corresponding reference numbers in the 600 series, and will not necessarily be described again here.

In this example, the human-machine-interface system 600 has four processing-element-slices, four processing-elements (PE), and four register-files (RF) in the register-file-memory 602. Ten registers are included in the register-array 624, such that a subsampling value of 1, 2 or 3 can be applied. In this example, the register-file-memory 602 also includes a weights-memory 654 and a bias-memory 656. In other examples, the weights-memory 654 and a bias-memory 656 can be provided separately from the register-file-memory 602. The weights-memory 654 and the bias-memory 656 can be independent of the number of processing slices.

The weights-memory 654 can provide weights-data to each processing-element (PE3, PE2, PE1, PE0) of the processing-element-slices, such that each processing-element can apply the arithmetic and logic operation based on the weights-data, as will be discussed below with reference to FIG. 7.

Similarly, the bias-memory 656 can provide bias-data to each processing-element (PE3, PE2, PE1, PE0), such that each processing-element can apply the arithmetic and logic operation based on the bias-data, as will be discussed below with reference to FIG. 7.

In this example, both the register-file-memory 602 and the register-array 624 include switches/multiplexers, that are controlled by the controller 626, to make sure that the values follow the correct data-path from the register-files (RF) to the registers in the register-array 624. The registers that are active in the register array depend on the subsampling rate of the given layer in the following way: if the subsampling rate is 1, only the registers numbered as 1, 2, 3 and 4 will be used. If the subsampling rate is 2, the registers numbered as 1, $1_2$, 2, $2_2$, 3, $3_2$ and 4 are used. If the subsampling rate is 3, the registers numbered as 1, $1_2$, $1_3$, 2, $2_2$, $2_3$, 3, $3_2$, $3_3$ and 4 are used.

The processing-elements will receive the necessary data from the register-file-memory 602 (directly for the weights and bias, and indirectly via the registers for the data) to perform the arithmetic and logic operations, and they can then write the results back to the register-file-memory 602 RF. This can be considered as generating one new pixel-data by convolving the filter and data only. As the filter is displaced, and the convolution is performed again, this will generate a new pixel data, and so on. Thus, the system can write back results to the register-file-memory 602 because the computation of the convolution held the MACC (multiply-accumulate) for one row at a time of the filter. However, the rows still need to be added to generate the single new pixel-data. This will be described in more detail below with reference to FIG. 7.

Figure 7:
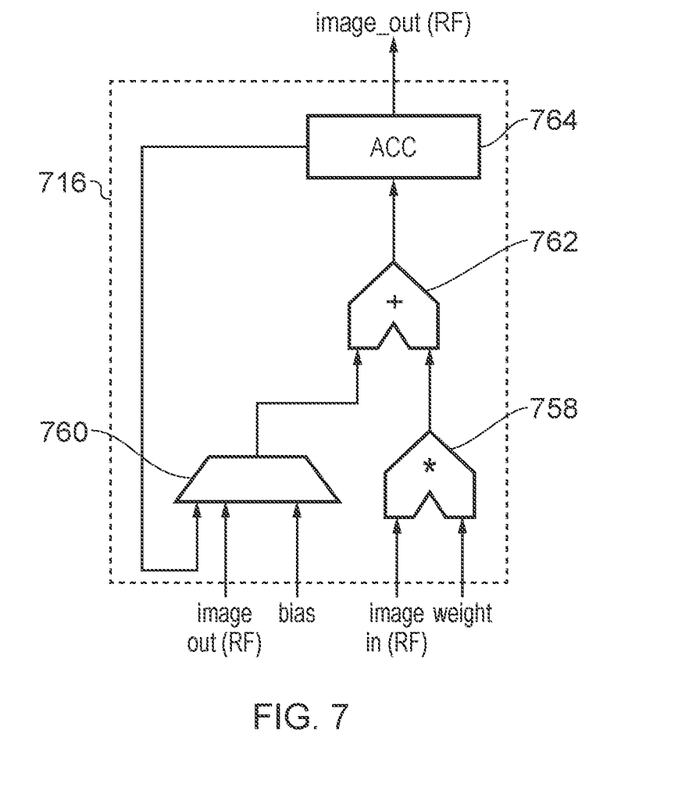
FIG. 7 shows an example implementation of a processing-element 716, such as the ones shown in FIG. 6.

FIG. 7 shows an example implementation of a processing-element 716, such as the ones shown in FIG. 6.

The processing-element 716 applies the following equation below, $$O(x, y) = \sum_{k=0}^{K-1} \sum_{l=0}^{L-1} w[k, l] * I[x+k, y+l] + b$$

whereby O(x,y) holds the result at coordinates x,y of convolving weights and input data and bias. Notice that the inner summation multiplies and accumulates column-wise on a single row k. This operation is repeated for every row through the outer summation.

As shown in FIG. 7, the processing-element 716 includes:

a multiplier 758 that multiplies: (i) the input-data (image_in), which can be received indirectly from a register-file (RF) via a register, by (ii) weights-data (weight), which can be received from a weights-memory;

an adder 762 that adds together: (i) the output of the multiplier 758, and (ii) the output of a multiplexer 760;

the multiplexer 760, which passes one of the following input signals to its output: (i) bias-data (bias), which may be received from a bias-memory; (ii) image_out (as will be discussed below with reference to "step 3"), which can be received from a register-file (RF); and (iii) an accumulator-output-value. The multiplexer 760 is controlled by a controller (not shown);

an accumulator 764, which accumulates the values provided at the output of the adder 764, provides an accumulator-output-value (image_out) that can be written into the register-file-memory, and is also provided as an input to the multiplexer 760.

The processing-element 716 applies an algorithm as follows:

Step 1: Data/from the register-files (RF) is loaded into the PE registers. Then the processing-element 716 applies multiply-accumulate operation and shift operations to execute W*I. The inputs that are used by the processing-element 716 for this processing step are weight and image_in. Also, the controller provides a multiplexer-control-signal to the multiplexer 760 such that the accumulator-output-value from the accumulator 764 is provided as an input to the adder 762.

Step 2: The controller provides a multiplexer-control-signal to the multiplexer 760 such that the bias is now loaded from the register-file-memory into the PE registers and accumulated to the previous results of the partial convolution by the adder 762 and the accumulator 764. After this operation is finished, the results are passed through the LUT (not shown in FIG. 7, although it is shown in FIG. 3) and provided as the accumulator-output-value (image_out) so that they can be stored in the register-file-memory. The input to the processing-element 716 that is being used in this processing step is bias.

Step 3: The controller provides a multiplexer-control-signal to the multiplexer 760 such that the image_out is passed to the output of the multiplexer 760. In this way, the accumulated results that were stored in the register-file-memory at step 2 are added to finally complete the convolution operation and provide feature-map-output-data. Subsequently, the accumulator-output-value (image_out) is stored in the register-file-memory, which can also be referred to as the "feature map" (feature-map-output-data). It will be appreciated that any processing-element can perform this processing.

At the end of these operations (convolution and subsampling (which was not explicitly mentioned above)) the processing-element 716 provides the "feature map", which is a matrix including convolved results. This can be held in the reference-file-memory. Then the feature maps can be fed into a fully connected neural network to obtain the final classification.

Figure 8:
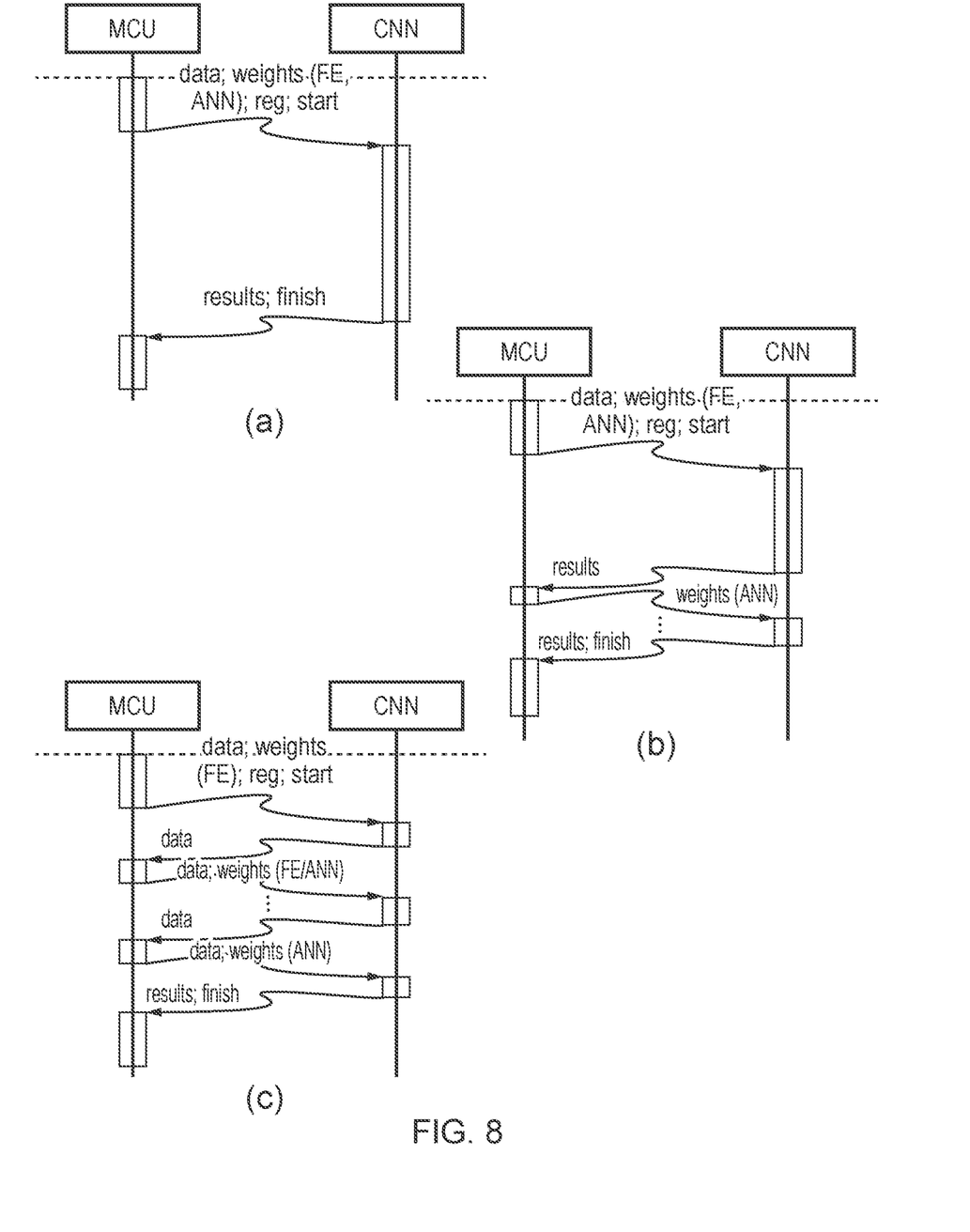
FIGS. 8a-c show three example operating modes of a human-machine-interface system (CNN accelerator) that is disclosed herein.

FIGS. 8*a-c* three example operating modes of a human-machine-interface system (CNN accelerator) that is disclosed herein: (a) Full, (b) Full Feature Extraction, and (c) Partial. The operating mode that is used can depend upon the amount of data that it has to store in the register-files (RFs). These modes can be specified as follows:

Full. This mode relates to the use case when the data can entirely be held in the CNN register files. Both feature extraction (FE) and classification (ANN) layers are computed in one run.

Full Feature Extraction. This mode relates to computing the feature extraction once followed by one or more runs of the classification stage. This offers opportunities to update, or even entirely change the weights of the classification stage so that distinct classifications can be performed with the same extracted feature set.

Partial. This mode can be used when the data does not fit in the register files. In this case, the feature extraction and classification can be carried out in several stages, and the entire process can be reconstructed in a host processor.

The following Application Programming Instruction (API) calls can be supported by a human-machine-interface system (CNN accelerator) that is disclosed herein:

send_configuration( )—It is used to program the configuration registers which will specify the CNN structure. It is used only in the initialisation phase.

send_feature_extraction_weights( )—It is used to send the values of the weights in the feature extraction layer. When operating in mode full and full feature extraction, it is only used in the initialisation phase. When operating in mode partial, it will also be called during the feed-forward execution.

send_classifier_weights( )—It is used to send the values of the weights in the classification layer. When operating in mode full, it is only used in the initialisation phase. When operating in mode full feature extraction and partial, it will also be called during the feed-forward execution.

send_data( )—It is used to send the input data to process. It is called right before the start command.

run( )—It is used to start the computation of the algorithm.

read_result( )—It is used to read the results once the feed-forward execution of the algorithm has been completed.

EXAMPLE APPLICATIONS

With the continuous expansion of computer applications, the computer has become a commodity that can be installed in people's pockets. To help people deal with daily office operations and affairs of life, the natural man-machine interface, man-machine environment and harmonious world of information has gradually become the focus of attention. Especially in a competitive market environment, it can be particularly beneficial for a computer or device to have an intuitive user interface. Small form-factor IoT end nodes can benefit from novel natural Human Machine Interfaces (HMI), e.g. gesture and movement recognition. Essentially, for smaller form factors, which may be fashion-oriented: key/touch control may physically not be possible because the physical area of the device may not be large enough to receive a sufficient number of different touch commands. Interaction can be subtle and totally intuitive, building not on crude body movements but on subtle expressions and micro-gestures. This can be possible using tiny sensors that map every movement.

Gesture controls will notably contribute to easing our interaction with devices, reducing (and in some cases replacing) the need for a mouse, keys, a remote control, or buttons. When combined with other advanced user interface technologies such as voice commands and face recognition, gestures can create a richer user experience that strives to understand the human "language," thereby fueling the next wave of electronic innovation. Additional gesture recognition opportunities exist in medical applications where, for health and safety reasons, a nurse or doctor may not be able to touch a display or trackpad but still needs to control a system. In other cases, the medical professional may not be within reach of the display yet still needs to manipulate the content being shown on the display. Appropriate gestures, such as hand swipes or using a finger as a virtual mouse, are a safer and faster way to control the device. The below table shows examples of contextual interpretation. Gesture recognition as a user interface scheme also applies to a wide range of applications beyond consumer electronics.

| Context Type | Context Value |
| --- | --- |
| Physical Activity | Standing, sitting, walking, running |
| Sign Language | "hello", "good bye", "a, b, c, . . . " |
| Gesture Recognition | Swipe left, swipe right, pinch |
| Tennis Strokes | Forehand, backhand, volley |
| Voice recognition | "play", "stop", "pause" |

Advantageously, one or more of the human-machine-interface systems disclosed herein can enable such gesture recognition systems to be implemented in an efficient way, in terms of the processing overhead and power required to recognise the gestures.

Examples disclosed herein can benefit from the following features/functionality:

A hardware accelerator for the CNN algorithm when used to classify analog-sensor data (inertial, pressure, etc.). In this way, low throughput applications (e.g. gesture/movement recognition) can benefit from an energy efficient standalone hardware accelerator with configurable and scalable processing capabilities. For example, the accelerator can have a plurality of processing-elements, and only a subset of the processing-elements can be selectively enabled by a controller, for instance depending upon the computing requirements. Also, the CNN can be selectively configured to a user's needs. For example, a controller can selectively set the size of a filter, the number of filters, a subsampling level, etc.

The CNN hardware accelerator can be geared to deal with continuous time analog signals possibly with relatively low sampling rates, e.g. inertial, acoustic, radar, etc. An application space based on continuous-time analogue signals, that are suitable for low power (wearable) devices, can be targeted. The application domain can fall under Human Machine Interfaces for IoT, e.g. gesture recognition, voice recognition, proximity detection, human movement detection, gaming, etc.

Complex microarchitectures with high parallelization, which would be an overkill for human machine interfaces that use inertial, pressure, and acoustic sensors for example, may not be required. Therefore, the skilled person would not consider any systems that are known for very high performance image/video processing applications to be suitable for use in a human-machine-interface system. This is because image/video processing applications would consume too much power to even be considered them unsuitable for human-machine-interface system such as for low power (wearable) electronics.

A standalone CNN accelerator can be provided. The accelerator does not need to act as a complex operator (e.g. multiply-accumulate), which receives data, performs operations and returns data, and the data flow does not have to be always mastered by a host processor. Instead, the accelerator can run a complete algorithm without communication with a host processor when the memory requirements of the algorithm structure do not exceed the memory of the accelerator. Therefore, a high communication overhead between host and computing unit(s) can be avoided.

Data sharing between different processing-elements (PEs) can be provided, therefore PE data reuse can be advantageously exploited.

Subsampling does not need to be performed by the main processor. For example, it can be performed simultaneously with convolution operations in some examples. In this way, merged convolution and subsampling operations can avoid, or reduce the likelihood, of a bottleneck in the CNN algorithm.

Providing the processing-elements as an array can be more beneficial than sharing data through a shared memory bus. This is because data can be kept local in the CNN RF memory, and because such local RF transactions use less power than having to retrieve data from a central memory block of the system.

The human-machine-interface system is not limited to a specific number of convolving kernels, which may be selectable only through an input switch.

The human-machine-interface system may not require a special controller to assign a partial area of a memory to each processing node. Therefore, memory transactions may not dominate the CNN algorithm, thereby providing advantages in terms of energy efficiency because of a high overhead for the memory controller can be avoided.

One or more of the human-machine-interface systems disclosed herein can:

include four pipelined execution phases: that can be advantageous in terms of configurability, weight programmability, data loading, execution, and reading of results.

include a number of processing-elements, PEs, to exploit parallelism, to re-use data, and to provide the required throughput at low voltage operation for the sake of energy efficiency.

exploit improved/maximum data reuse of a local register file for computation through an optimized systolic flow. Since accelerator can be standalone, good memory management can be significant to reducing power consumption. Accelerators disclosed herein can provide an improved/optimal dataflow between local register files and processing elements, and can reduce/minimize the number of memory accesses by profiting from data reuse.

efficiently compute the feature extraction layers (with merged convolution and subsampling), which otherwise could be a major bottleneck of the algorithm.

implement a flexible algorithm in hardware, by utilising hardware constructs that resemble the variable and sequential execution model.

This can include the kernel size, number of layers, number of kernels per layer, connections between feature extraction layers and number of neurons in the classification stage. It can also include the operation mode, and status and start registers, which indicate when the CNN has finished or needs to begin the computation.

be provided such that the output of the accelerator is the probability that the event corresponds to each of the possible output classes.

include a set of Application Programming Instructions (APIs) to control and configure the CNN accelerator.

Therefore, context-aware computing hardware can be provided that can discover and take advantage of contextual information to perform energy-constrained operations. End-node processors can be characterized by requirements such as more data, more sensors, faster responses, more connectivity, and smart user interfaces. General purpose or standard processors are popular for running applications in deeply embedded systems, not optimized for these end-node specific tasks. Typically, such processors exceed the power budget of the embedded function resulting in shorter battery lifetime. Examples disclosed herein can provide a hardware accelerator for convolutional neural networks that is suitable for classifying events based on continuous-time analogue signals such as acoustic, inertial, radar, etc.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services.

As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. A human-machine-interface system comprising:
a register-file-memory, configured to store input-data;
a first-processing-element-slice comprising:
   a first-register configured to store first-register-data; and
   a first-processing-element configured to perform an arithmetic and logic operation on the first-register-data to obtain first-convolution-output-data;
a second-processing-element-slice comprising:
   a second-register configured to store second-register-data; and
   a second-processing-element configured to perform a convolutional neural network algorithm on the second-register-data to obtain second-convolution-output-data; and
a controller configured to:
   load input-data from the register-file-memory into the first-register as the first-register-data; and
   load one of the input-data from the register-file-memory and the first-register-data from the first-register into the second-register as the second-register-data, wherein the controller is configured to load one of the input-data and the first-register-data based on a subsampling rate between the input-data and convolution-output-data.

2. The human-machine-interface system of claim 1, wherein the controller is configured to:
load a first subset of the input-data from the register-file-memory into the first-register as the first-register-data; and
load a second subset of the input-data from the register-file-memory into the second-register as the second-register-data, wherein the first subset of input-data is different from the second subset of input-data.

3. The human-machine-interface system of claim 1, further comprising:
an intermediate-register; and
wherein the controller is configured to:
   load the first-register-data from the first-register into the intermediate-register as intermediate-data; and
   load the intermediate-data from the intermediate-register into the second-register as the second-register-data.

4. The human-machine-interface system of claim 3, further comprising a plurality of intermediate-registers, serially connected between the first-register and the second-register.

5. The human-machine-interface system of claim 1, further comprising:
one or more further-processing-element-slices, such that the first-processing-element-slice, the second-processing-element-slice and the one or more further-processing-element-slices comprise a sequence of processing-slices,
wherein each of the one or more further-processing-element-slices comprises:
a further-register configured to store further-register-data;
a further-processing-element configured to perform a convolutional neural network algorithm on the further-register-data to obtain further-convolution-output-data;
wherein the controller is configured to:
load one of input-data from the register-file-memory and register-data from an earlier register in the sequence of processing-slices into each further-register as the further-register-data based on the sub-sampling rate.

6. The human-machine-interface system of claim 1, further comprising:
a weights-memory, configured to provide weights-data to each processing-element of the processing-element-slices;
wherein each processing-element of the processing-element-slices is configured to perform the arithmetic and logic operation based on the weights-data.

7. The human-machine-interface system of claim 1, further comprising:
a bias-memory, configured to provide bias-data to each processing-element of the processing-element-slices;
wherein each processing-element of the processing-element-slices is configured to perform the arithmetic and logic operation based on the bias-data.

8. The human-machine-interface system of claim 1, wherein the:
register-file-memory comprises a register-file-block associated with each of the processing-element-slices; and
the controller is configured to load input-data into the first-register of the first-processing-element-slice or the second-register of the second-processing-element-slice, respectively, from the associated register-file-block.

9. The human-machine-interface system of claim 8, wherein the controller is configured to load input-data into the register of a processing-element-slice from a register-file-block associated with a different processing-element-slice.

10. The human-machine-interface system of claim 1, further comprising a look-up-table configured to apply a non-linear function to the convolution-output-data provided by each of the processing-elements to obtain feature-map-output-data.

11. The human-machine-interface system of claim 10, wherein the controller is configured to write the feature-map-output-data into the register-file-memory.

12. The human-machine-interface system of claim 11, wherein a third-processing-element is configured to add the feature-map-output-data to obtain output-classification-data.

13. The human-machine-interface system of claim 1, wherein the input-data is representative of non-contact human-machine-interface-signals.

14. The human-machine-interface system of claim 1, wherein the input-data comprises analogue sensor data.

15. The human-machine-interface system of claim 1, wherein the human-machine-interface system comprises a gesture recognition system.

16. The human-machine-interface system of claim 1, wherein the controller is further configured to:
during a first processing cycle:
load input-data from the register-file-memory into the first-register as the first-register-data, and
load input-data from the register-file-memory into the second-register as the second-register-data; and
during a subsequent processing cycle:
load the first-register-data from the first-register into the second-register as the second-register-data, and
load input-data from the register-file-memory into the first-register as the first-register-data.

* * * * *